United States Patent [19]
Van Kerrebrouck

[11] Patent Number: 6,066,388
[45] Date of Patent: May 23, 2000

[54] PROCESS FOR THE PRODUCTION OF A NONWOVEN AND NONWOVEN OBTAINED BY THIS PROCESS

[76] Inventor: Jozef Van Kerrebrouck, Lanzen Kliever Straat 2, 8730 Beemem, Belgium

[21] Appl. No.: 08/927,820

[22] Filed: Sep. 11, 1997

Related U.S. Application Data

[63] Continuation of application No. 08/495,464, filed as application No. PCT/BE94/00008, Jan. 25, 1994, abandoned.

[30] Foreign Application Priority Data

Jan. 26, 1993 [FR] France ................................ 93 00746

[51] Int. Cl.$^7$ ............................................ B32B 5/06
[52] U.S. Cl. ...................... 428/218; 442/388; 442/389; 442/403; 442/407
[58] Field of Search ................... 442/388, 389, 442/403, 407; 428/218

[56] References Cited

U.S. PATENT DOCUMENTS

| | | |
|---|---|---|
| 3,257,264 | 6/1966 | Scheuerman ............... 428/300 |
| 4,445,954 | 5/1984 | Adams et al. . |
| 5,298,319 | 3/1994 | Donahue et al. ............... 428/300 |
| 5,629,005 | 5/1997 | Brassington et al. ............... 442/403 |

FOREIGN PATENT DOCUMENTS

| | | |
|---|---|---|
| 91 10768 | 7/1991 | WIPO . |
| 92 05949 | 4/1992 | WIPO . |

*Primary Examiner*—Elizabeth M. Cole
*Attorney, Agent, or Firm*—Pillsbury Madison & Sutro LLP

[57] ABSTRACT

A nonwoven (1) comprising two outer fiber layers (3, 4) and at least one inner fiber layer (2) having a different composition from that of the outer layers (3, 4). The nonwoven (1) comprises structural fibers (7, 8) and binding fibers (5, 6), said binding fibers (5, 6) at least partially consisting of a polymer with a lower melting point than the structural fibers (7, 8). Said nonwoven (1) is densified by needling on both sides to a given depth while leaving an undensified central region. A method for producing the nonwoven is also disclosed.

24 Claims, 2 Drawing Sheets

PROCESS FOR THE PRODUCTION OF A NONWOVEN AND NONWOVEN OBTAINED BY THIS PROCESS

This is a continuation of application Ser. No. 08/495,464, filed on Sep. 11, 1995, which was abandoned upon the filing hereof Sep. 11, 1997, which is a 371 of PCT/BE94/00008 filed Jan. 25, 1994.

SUBJECT OF THE INVENTION

The invention relates to a process for the production of a multi-layer nonwoven and to the nonwoven obtained by this process.

TECHNOLOGICAL BACKGROUND AND STATE OF THE ART

The technology for forming nonwoven fabric in the dry way involves forming laps of fibres or of filaments which are subsequently consolidated by the binding of the fibres mechanically (needling), chemically or thermally.

Multi-layer nonwovens are already known in the state of the art.

U.S. Pat. No. 3,298,080 discloses a process for producing a multi-layer needled nonwoven having a fineness gradient. The inner layers have the finest fibres. Moreover, the orientation of the fibres varies from layer to layer. In this technique, the lap is formed by superposing the various loosely entangled fibre layers, and then the needling is carried out in order to bind the various layers to one another. The entanglement of the fibres increases towards the centre of the lap. Consequently, primarily the inner layer is rigid, the outer layers being more flexible.

U.S. Pat. No. 5,106,679 discloses a three-layer self-supporting composite material which can be used as the interior ceiling of a vehicle. Rigidity is obtained by means of a fibrous core comprising palm or flax fibres and a fibrous reinforcing material, this core being contained between two surface covering layers.

In view of the heterogeneousness of its composition, such a product cannot be entirely recyclable.

Document US-A-4,840,832 also discloses a flexible and elastic vehicle ceiling consisting particularly of a nonwoven composed of binding fibres. In this process, polymer fibres are, where appropriate, bound together by means of light needling at a multiplicity of points, so as to form a coherent lap of a stability making it possible to handle it subsequently and to wind it. This nonwoven does not achieve the rigidity desired in order to be self-supporting.

It is also known to obtain needled and thermally bound three-layer nonwovens having high rigidity. In fact, international patent application WO-A-92/05949 discloses a process for producing a rigid nonwoven composed of 3 layers. The outer layers are composed of fibres having a relatively low melting point. The inner layer is composed of a mixture of fibres of the same type with fibres having a higher melting point. In this process, each layer is previously bound and wound, and then the various layers are bound to one another by needling. This needling is therefore carried out through the various layers and, moreover, drives the fibres of the outer layers into the inner layer. Subsequently, the three-layer composite is heated to a level higher than the melting point of the fibres of the first type, so as to form a plasticized structure.

There is no provision for this product thereafter to be moulded, and it is used solely in sheet form.

Patent application EP-A-0,388,062 discloses a process for the production of an absorbent material composed of a nonwoven bound by needling, the needling of which is not carried out through the entire thickness of the fibre lap. This is referred to as progressive needling. A nonwoven of progressive density, useful as absorbent material, is then obtained. This nonwoven consists of a single fibre layer and is not thermo-formable.

Patent application EP-A-0,476,538 discloses a process for the production of a needled nonwoven moulded by thermal bonding and used in the motor-vehicle industry. This product is composed of fibres of polyester, polyamide or polyolefin and comprises two types of fibre, namely adhesive fibres and non-adhesive fibres. The adhesive fibres are highly amorphous fibres, that is to say fibres which soften and crystallize permanently during the thermal binding. Once bound, this nonwoven can therefore no longer be thermoformed by moulding.

OBJECTS OF THE INVENTION

One object of the invention is to produce, according to a simple and rapid process, a thermoformable nonwoven, that is to say a nonwoven capable of being shaped subsequently by moulding.

Furthermore, an object of the invention is to produce a rigid and self-supporting nonwoven.

Another object of the invention is to produce a flexible and deformable nonwoven.

The object is also to produce such a structure which is entirely recyclable.

The object is also to develop such a process which comprises fewer steps than the known processes of the state of the art.

Yet another object is to provide a process which makes it possible to obtain such a composite material rapidly from crude fibres.

ESSENTIAL ELEMENTS OF THE INVENTION

The process according to the invention for the production of a nonwoven is characterized by a particular combination of mechanical and thermal binding of a fibrous composition which consists of at least three layers.

The subject of the present invention is a nonwoven which comprises two outer fibre layers and at least one inner fibre layer which is composed of constructive fibres and of binding fibres. The said binding fibres have, at least as regards part of the fibre, a melting point lower than that of the constructive fibres. By constructive fibres are meant fibres, the melting point of which is higher than the thermal binding temperature of the nonwoven. The said binding fibres are composed at least partially of at least one polymer, the melting point of which is lower than that of the constructive fibres.

The nonwoven according to the invention is densified by a needling on either side to a specific depth, there remaining a central zone not densified by needling.

According to one possible embodiment, this non-densified central zone corresponds substantially to the inner fibre layer.

This non-densified central zone comprises at least part of the inner fibre layer. The needling depth corresponds substantially to the thickness of the outer layers or can slightly exceed the limit between the various fibre layers.

The content (%) of polymer, the melting point of which is lower than that of the constructive fibres, is greater in the outer layers than in the inner layer or inner layers.

The outer layers, which serve mainly for providing the rigidity of the product after moulding, represent, for each layer, between 5% and 40% by weight of the entire nonwoven. The inner layer or inner layers therefore represent between 20% and 90% of the entire nonwoven.

Advantageously, the outer layers form, for each layer, between 15% and 30% of the entire nonwoven. Thus, the inner layer forms particularly between 40% and 70% of the entire nonwoven.

Advantageously, the binding fibres are composed at least partially of a thermoplastic polymer. By thermoplastic is meant a polymer which can be fluidized by an increase in the temperature, in contrast to thermo-settable polymers for which melting is impossible.

The binding fibres can be single-component or advantageously two-component. Where two-component fibres are concerned, only one of the components is a polymer, the melting point of which is lower than that of the constructive fibres and which will ensure the thermal binding of the fibres with one another. This polymer is preferably thermoplastic.

Advantageously, the outer layers comprise from 40 to 100% of binding fibres and from 0% to 60% of constructive fibres, and preferably from 60 to 80% of binding fibres and from 20 to 40% of constructive fibres.

Advantageously, the inner layer or inner layers comprise from 20 to 100% of binding fibres, preferably from 20 to 90% or, even more preferably, from 40 to 60% of binding fibres, and from 0 to 80% of constructive fibres, preferably from 10 to 80% or, even more preferably, from 40 to 60% of constructive fibres.

It will easily be understood that the content of binding fibres in the various layers is a function of the type of binding fibre selected (single-component or two-component).

Advantageously, at least some of the fibres of the outer layers are finer than at least some of the fibres of the inner layer or inner layers.

In particular, the constructive fibres of the outer layers are finer than the constructive fibres of the inner layer or inner layers.

In particular, the binding fibres of the outer layers have a thickness of between 0.5 and 28 dtex, and preferably between 1.5 and 10 dtex.

In particular, the binding fibres of the inner layer or inner layers have a thickness of between 3 and 40 dtex, and preferably between 4 and 28 dtex.

In particular, the constructive fibres of the outer layers have a thickness of between 0.5 and 28 dtex and preferably of between 1.5 and 12 dtex.

In particular, the constructive fibres of the inner layer or inner layers have a thickness of between 3 and 100 dtex and preferably of between 6 and 28 dtex.

According to an advantageous embodiment of the invention, the fibres composing the nonwoven all belong to the same family of polymers.

In particular, the fibres comprise 100% polyester.

According to alternative embodiments of the invention, the fibres comprise 100% polyamide or 100% polyolefin.

In particular, the nonwoven according to the invention is self-supporting and thermoformable.

According to one alternative embodiment of the invention, the nonwoven comprises a finishing layer.

According to another alternative embodiment of the invention, the nonwoven comprises one or more physical reinforcements.

Another subject of the invention is a process for the production of a multi-layer nonwoven comprising constructive fibres and binding fibres. The said birding fibres are composed at least partially of a polymer, the melting point of which is lower than that of the said constructive fibres. The process according to the invention is characterized by the following phases:

a) a multi-layer "sandwich" structure comprising at least three layers of cut textile fibres or of filaments is constructed by carding and lapping, b) a superficial needling, allowing a non-needled central zone to remain, is carried out, c) the thermal binding of the nonwoven is carried out.

Advantageously, the binding fibres used are of the thermoplastic type. They can be single-component or preferably two-component. In this case, only one of the components is of the thermoplastic type (and is not capable of crystallizing).

Advantageously, the outer layers comprise from 40 to 100% of binding fibres and the inner layer or inner layers from 20 to 100% of binding fibres.

According to particular embodiments of the process according to the invention, the proportions of fibres used and the characteristics of the fibres used are as described above.

According to a particular embodiment of the process according to the invention, reinforcements are added during the lapping phase. These reinforcements consist particularly of fabrics, nonwovens, knits, lattices or various films.

According to one alternative embodiment, the process according to the invention comprises a finishing phase, such as, for example, impregnation with chemical or binding treatments.

In particular, the process according to the invention comprises a moulding phase.

DETAILED DESCRIPTION OF THE FIGURES

Figure 1:
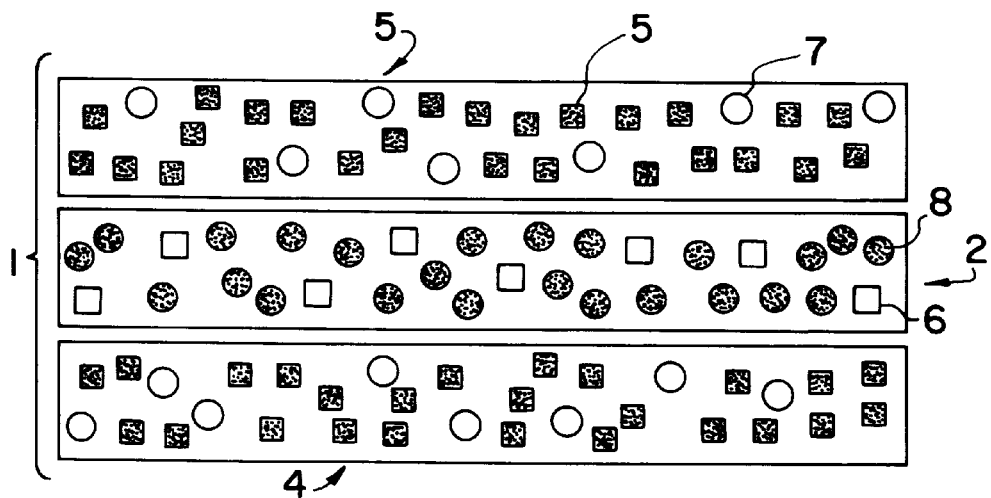
FIG. 1 is a diagrammatic representation of a nonwoven structure according to the invention.

The structure illustrated in FIG. 1 is an example of a nonwoven 1 which can be obtained by the process of the invention and which has three separate layers arranged in a "sandwich" configuration. The inner layer 2 is arranged between two outer layers 3, 4 of a composition different from that of the layer 2. The outer layers 3, 4 can either be identical to one another or be slightly different.

The nonwoven 1 comprises binding fibres and, where appropriate, constructive fibres.

The composition of the fibre layers is symbolized in the following way in FIG. 1: squares represent binding fibres, designated respectively by the numerals 5 and 6, depending on the type of layer where they are present. In the outer layers 3, 4, the binding fibres 5 are represented by black squares, and in the inner layer 2 the binding fibres 6 are represented by white squares.

These binding fibres 5, 6 have, at least as regards part of the fibre, a melting point which is relatively low and, in all cases, is below that of the constructive fibres. Circles represent the constructive fibres, designated respectively by the numerals 7 and 8, depending on the type of layer where they are present. In the outer layers 3, 4, the constructive fibres 7 are represented by white circles, and in the inner layer 2 the constructive fibres 8 are represented by black circles.

The binding fibres 5, 6 can be of the single-component type or preferably of the two-component type, that is to say comprising two components, only one of which has a "low" melting point and serves as a binder. The fibres of the two-component type can be of two-phase structure ("side-by-side"), of coaxial structure ("sheath-and-core") or of paired structure ("matrix/fibril").

The differences between the layers relate particularly to the fineness of the fibres and additionally to their length and to the proportion of fibres of the two types. The outer 3, 4 and inner 2 layers also differ in the method of binding of the fibres.

The constructive fibres 7 of the outer layers 3, 4 are finer than the constructive fibres 8 of the inner layer 2.

Of the constructive fibres of desired fineness, the longest possible fibres will preferably be selected for the outer layers.

The thickness of the constructive fibres 7 of the outer layers 3, 4 can vary from 0.5 dtex to 28 dtex, whilst the thickness of the constructive fibres 8 of the inner layer 2 can vary from 3 to 100 dtex.

Moreover, the proportion of binding fibres 5 in the outer layers 3, 4 varies from 40 to 100% of the composition. The lower layer 4 can, where appropriate, be slightly more flexible than the upper layer 3. In this case, it contains fewer binding fibres 5 then the upper layer 3. In the inner layer 2, the binding fibres 6 represent from 20 to 100% of the composition.

The fibres 5, 7 of the outer layers 3, 4 have been intermingled by needling and are therefore entangled on each side of the structure, this occurring to a specific depth, preferably in proximity to the limit between the outer 3, 4 and inner 2 layers.

To obtain the above-described structure, the process of the invention, as described below in general terms, can be applied in particular.

In a first phase, binding fibres 5 or 6 are mixed respectively with constructive fibres 7, 8, and the formation of the nonwoven webs is carried out by carding (second phase). As many cards as layers of different compositions it is desired to obtain can be used. Alternatively, a single card can also be fed by means of the so-called "split-feed" system, in which the feed of a card can be divided into compartments receiving different fibre mixtures. The cards used can be of the worsted (Worsted, Cotton Card) or pneumatic (Airlay) type. They are arranged in line or perpendicularly to the line in the case of lapping. For this lapping, a spreader/lapper (Blamire) or "camelback" could be used. The various layers can pass by way of a drawing station, before being bound. Reinforcements, such as fabrics, nonwovens, knits, lattices or various films, can also be introduced at this stage.

The lap formed at the exit of the train of cards and spreaders (second phase) already has a "sandwich" configuration in three layers, before being bound. Contrary to the known techniques, therefore, there are no steps for the formation of a lap in one layer, the binding of the latter and then the superposition of three laps.

A first densification (third phase) takes place by means of a needling process, only on the surface. The result of this mechanical transporting and mingling action on the fibres by the needles is a densification and a toughness as a result of the frictional and catching forces in the region of the surface of the fibres. The needling process is controlled so as to have this effect to a predetermined depth, in the outer layers only. Thus, the multi-layer or "sandwich" structure is increased, and therefore the rigidity of the product is more pronounced.

The main binding (fourth phase) takes place thermally by an increase in the temperature above the melting point of the binding fibres 5, 6, the effect of this being to cause them to melt completely or partially. Where two-component fibres are concerned, only one of the components has a melting point lower than the thermal binding temperature.

The thermal treatment can take place by contact with a hot surface, by induction with high-energy waves, by conduction or by exchange with heated air. This treatment has the main function of binding the nonwoven 1, but can also have a function of thermal stabilization of the product, in order to avoid thermal contraction during the use or the finishing of the product after production. Thus, a treatment can be selected at a temperature much higher than the melting point of the binding fibres 5, 6, particularly approaching the thermosetting temperature of the constructive fibres 7, 8.

The production process can be completed by finishings, such as impregnation with chemical or binding treatments. Coating or complexing with get-up materials, such as fabrics, nonwovens, knits, lattices, flock, synthetic leather, leather or various films, can also be carried out. This complexing is possible by gluing with sprayed glue, thermoadhesive film or calendering with thermoadhesive (hot-melt adhesive).

So that the product is perfectly recyclable, it is important that it be completely synthetic. All the fibres are preferably selected from the same family of chemical polymers. This means that it is preferable to have, for example, a mixture of 100% polyester or 100% polyolefin or 100% polyamide.

The finished product can take the form of plane sheets which are subsequently shaped. Since the binding fibres used (or the binding part of the two-component fibres) are thermoplastic, that is to say incapable of crystallizing, the thermal binding is not irreversible. The product can therefore be moulded thermally, if appropriate at a later stage, even though it has already undergone a first thermal binding.

FIGS. 2 to 5 show different diagrams of production lines, on which the process according to the invention can be put into practice.

Figure 2:
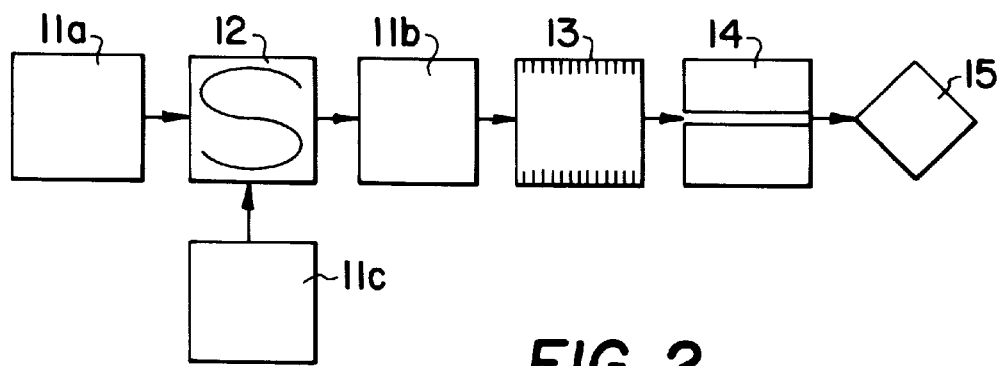
FIGS. 2 to 5 are diagrammatic representations of various production lines making it possible to carry out the process of the invention.

FIG. 2 shows diagrammatically a production line according to the invention which comprises three cards 11 and a spreader/lapper 12. Two cards 11a, 11b are arranged in line and are intended for forming the outer layers 3, 4. The card 11c and the spreader/lapper 12 are intended for forming the inner layer 2 and are located between the cards 11a, 11b of the outer layers and are arranged perpendicularly to the line of cards 11a, 11b. The three layers then pass into a needling station 13 densifying the outer layers 3, 4, then into a thermal binding station 14 and finally into a calendering station 15 for smoothing the surfaces of the nonwoven 1 and for cutting it to the desired size.

Figure 3:
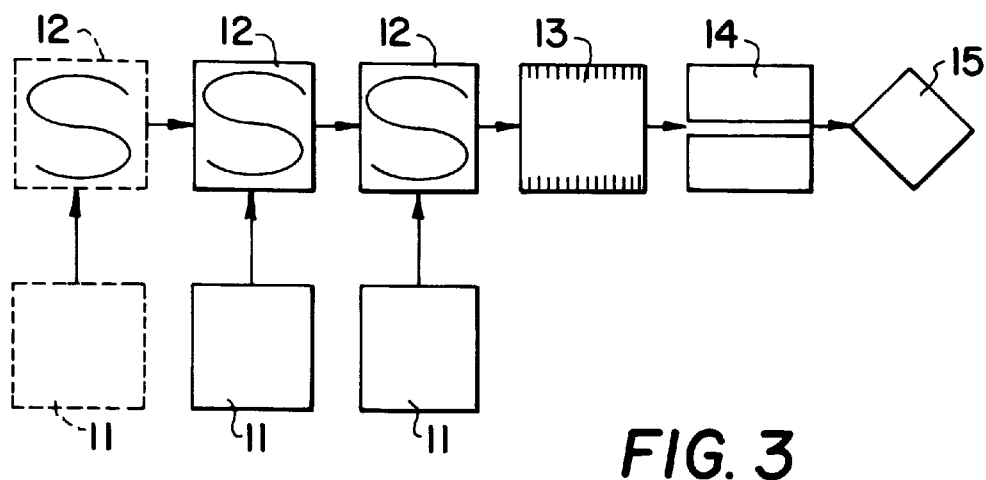

FIG. 3 illustrates a first alternative. The three cards 11 are arranged perpendicularly to the production line. Each card 11 is followed by a spreader/lapper 12. If conventional cards are used, one card and one spreader/lapper are required for each fibre layer desired.

If a card of the "split-feed" type is used, comprising two compartments which can contain different fibre mixtures, only two card plus spreader groups are then necessary in order to obtain a nonwoven of three layers. The needling 13, thermal binding 14 and calendering 15 stations are the same as in FIG. 2.

Figure 4:
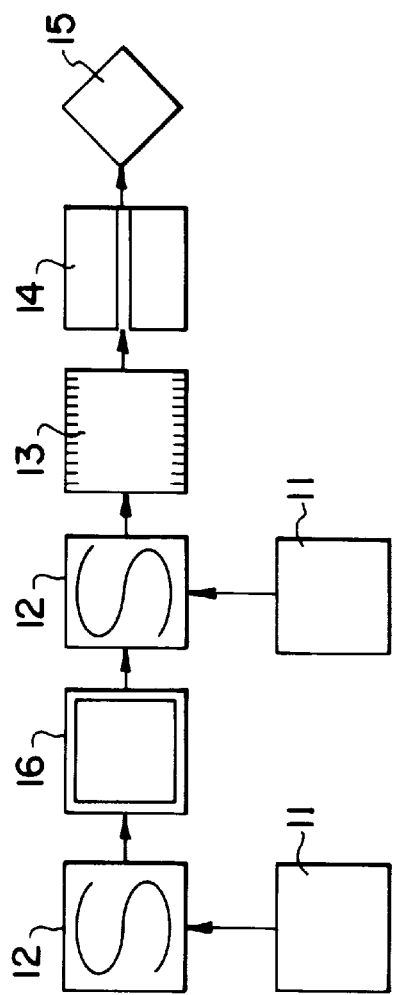

FIG. 4 illustrates a second alternative comprising three cards. Here, the card intended for forming the central layer 2 is a card 16 of the pneumatic type (Airlay: type Fehrer V21-K12 or K21, type D.O.A. or other types known to the average person skilled in the art) or consists of a system 16 making it possible to pleat or corrugate a fibre lap (CORWEB system, as described in U.S. Pat. No. 4,111,733 or STRUTO system, as described in German Patent DD 287,544-A5). These systems 16 make it possible to impart a three-dimensional structure to the inner layer 2 of the nonwoven 1 according to the invention.

This version makes it possible to produce a thicker finished product, without increasing its weight. This version also makes it possible to increase the resilience of the finished product.

Figure 5:
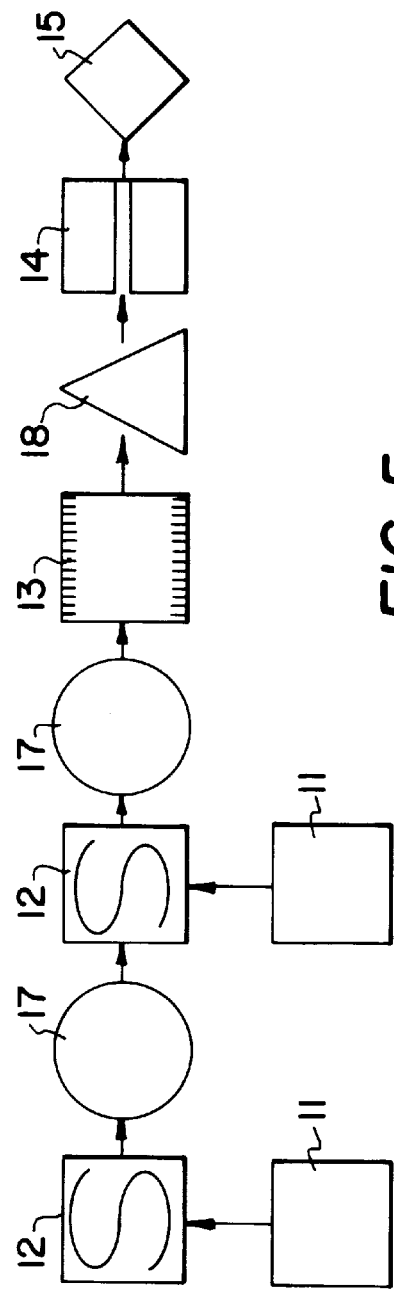

FIG. 5 illustrates another alternative of a production line according to the invention which comprises two cards 11 and two spreader/lappers 12 arranged perpendicularly to the production line. A station 17 is interposed between the two spreader/lappers 12, and in it physical reinforcements are unwound and arranged between the fibre layers. These reinforcements can, in particular, be fabrics, nonwovens, knits, lattices or various films.

A chemical treatment station 18 can also be added after the needling station 13. This chemical treatment can consist of an impregnation of the lap by a polyester resin or of a surface spraying of such a resin. The chemical treatment can also consist of a coating of a thermoplastic paste or powder (hot-melt) (by sprinkling, doctor, engraved roller or other systems well known to the average person skilled in the art).

The production line according to FIG. 5 makes it possible to obtain a nonwoven composed of more than three layers.

Other nonwovens composed of more than three layers can also be produced by adding a finishing layer, the function of which is, for example, to provide a soft and velvety feel.

Such a layer can come from a fourth card 11 located at the start of the production line, as shown diagrammatically by way of example in FIG. 3. This finishing layer can consist of a fibre mixture comprising, for example, from 0 to 25% of binding fibres having low melting points.

Advantages

One of the advantages of the process according to the invention is that a rigid nonwoven is obtained by means of a simple and rapid process, and that it is thermoformable, the fibres used not being crystallized during the thermal binding.

Another advantage is that the nonwovens according to the invention are resistant and have good characteristics of deformability and flexibility. More explanations in this respect are given under the heading "comparative tests".

Another advantage is that the process according to the invention makes it possible to obtain the sandwich structure having a plurality of layers in one operation and no longer necessitates any combination of fibre laps already prebound.

The needling in the outer layers has the advantage of increasing the toughness of layers on the surface, without limiting the deformability of the product.

The thermal binding has the purpose of binding the inner layer and has the advantage of preventing the thermal contraction of the assembly. Thus, the process according to the invention gives a product which can be preheated and subsequently cold-moulded in combination with temperature-sensitive get-up layers.

Another advantage is that the composition of the nonwoven according to the invention is homogeneous, and the latter can therefore be recycled.

The invention can be better understood from the exemplary embodiments described below:

EXAMPLE 1

The nonwoven 1 according to the invention consists of three fibre layers arranged in sandwich form. The inner layer 2 comprises 50% constructive fibres 8 of a thickness of 12 denier (13.33 dtex) and of a cut length of 90 mm and 50% binding fibres 6 of the two-component type with a coaxial structure. The axis of the fibre 6 is polyethyleneterephthalate and the meltable outer component is a copolyester, the melting point of which is 195° C. These fibres 6 have a thickness of 4 denier (4.44 dtex) and a cut length of 51 mm. This inner layer 2 of the nonwoven 1 has a weight of 475 g/m$^2$.

The outer layers 3, 4 of the nonwoven 1 comprise 75% binding fibres 5. These fibres 5 have the same characteristics as the binding fibres 6 described above. The outer layers 3, 4 comprise 25% constructive fibres 7 have a thickness of 1.5 denier (1.67 dtex) and have a cut length of 38 mm. Each of the two outer layers 3, 4 of the nonwoven 1 has a weight of 160 g/m$^2$.

The sandwich structure is brought about by means of a production line, as illustrated in FIG. 3. After the mixing of the constructive 7, 8 and binding 5, 6 fibres, as indicated above, in the respective proportions, as indicated, the carding of the laps by means of the conventional cards 11 is carried out.

After carding, the fibre laps each pass into a spreader/lapper 12, until the desired weight per m$^2$ is obtained.

The sandwich structure thus obtained then undergoes densification by progressive needling. This is carried out by means of two needlers, the needles of which are of the SINGER type (15×18×40×3.5 CB 15), adjusted to penetrate only into the outer layers 3, 4 of the nonwoven 1, in particular the penetration of the needles reaching a thickness of 10 mm. One of the needlers works from below and the other from above the lap. The lap then passes to the station 14 for thermal binding by passage through an oven with forced ventilation by hot air at 200° C.

This temperature ensures the melting of the binding part (outer component) of the two-component fibres 5, 6 and is lower than the melting temperature of the constructive fibres 7, 8 and lower than the melting temperature of the axis of the two-component binding fibres 5, 6.

The lap thus obtained is still flexible, weighs 800 g/m$^2$ and has a mean thickness of 35 mm. This lap is used for moulding at a temperature of 200° C. for 1 minute in a moulding press with a pressure of 50 bar, to a thickness of 5 mm.

EXAMPLE 2

The nonwoven 1' according to this exemplary embodiment of the invention likewise consists of three fibre layers. The inner layer 2' of the nonwoven 1' comprises 50% constructive fibres 8' of a thickness of 15 denier (16.67 dtex) and of a cut length of 60 mm and 50% two-component binding fibres 6, as described in Example 1. This inner layer 2' of the nonwoven 1' has a weight of 400 g/m$^2$.

The outer layers 3', 4' of the nonwoven 1' comprise 75% two-component binding fibres 5 identical to the binding fibres 6 described in Example 1 and 25% constructive fibres 7' based on reprocessed polyester, of a thickness of 6 denier (6.67 dtex) and of a cut length of 60 mm. These layers 3', 4' each have a weight of 200 g/m$^2$.

The use of these reprocessed fibres is proof that the product with 100% polyester is highly recyclable in the same use. The nonwoven 1' of Example 2 is produced according to the same methods and parameters as in Example 1.

EXAMPLE 3

The nonwoven 1" according to the third exemplary embodiment of the invention comprises five fibre layers: an outer layer 3", a reinforcing lattice 9, an inner layer 2, a reinforcing lattice 9 and an outer layer 4".

The outer layers 3", 4" comprise 75% two-component binding fibres 5 identical to the two-component binding fibres 6 described in Example 1 and 25% constructive fibres 7" based on poly(bismethylenecyclohexaneterephthalate), of a thickness of 6 denier (6.67 dtex) and of a cut length of 50 mm. One example of such a fibre 7" is the fibre sold under the name KODEL® 211. The central layer 2" comprises 50% binding fibres 6, as described in Example 1, and 50% constructive fibres 8", likewise based on poly (bismethylenecyclohexaneterephthalate), of a thickness of 25 denier (27.78 dtex) and of a cut length of 75 mm. One example of such a fibre 8" is the fibre sold under the name KODEL® 231.

Between the outer 3", 4" and inner 2" layers are placed two reinforcing laps 9 consisting of filaments of 550 dtex and weighing 75 g/m².

This nonwoven 1" is obtained by means of a production line, as shown diagrammatically in FIG. 5.

Comparative tests

The nonwovens 1, 1', 1", as described in the above examples, were tested and compared with two standard products used in the motor-vehicle industry. The first standard is composed of a core of rigid polyurethane foam with two outer layers of glass fibre, this being produced according to U.S. Pat. No. 5,082,716. The second standard consists of a core of rigid polyurethane foam with two outer layers based on an impregnated nonwoven, this being produced according to U.S. Pat. No. 5,049,439.

The characteristics tested are the rigidity, measured by the breaking force, and the deformability or flexibility.

The method used corresponds to the GENERAL MOTORS method, known under the reference GME 60.293, or to the RENAULT method, known under No. 1643, and to the standard DIN 52352. In these methods, a dynamometer is used in order to deform, at its centre, a sample placed on two supports. The tests were conducted with samples of 100 mm by 250 mm. The apparatus measures the breaking force and the deformation itself (called the deflection at break). The standard products are characterized, in this test, by a somewhat high breaking force, but with a very low deflection at break. This is the main cause of breakage of the products, for example of get-up tops, during their positioning in a vehicle. Two important values for measuring the deformability were added: the deflection obtained by applying a force equal to half the breaking force and called "deformability" and the "bending moment", that is to say the breaking force multiplied by the deflection at break and divided by four. A maximum value of these parameters is desirable, whilst preserving good rigidity expressed by a satisfactory breaking force. A standard adopted at the present time requires a breaking force of 10 N.

The results are collated in the following table, from which it emerges clearly that the nonwovens 1, 1', 1" according to the invention have sufficient rigidity (the breaking force is higher than 10 n), whilst possessing greater flexibility and deformability than the standard samples.

TABLE

| | | | Standards | | Examples | | |
|---|---|---|---|---|---|---|---|
| | Symbol | Unit | 1 | 2 | 1 | 2 | 3 |
| Weight per m² | m | g/m² | 625 | 600 | 790 | 800 | 950 |
| Breaking force | F | N | 12.9 | 20.4 | 12 | 16.5 | 21.5 |
| Deflection at break | f | mm | 7 | 5 | 42 | 45 | 24 |
| Bending moment | Mb | Nmm | 22.6 | 25.5 | 126 | 185 | 129 |
| Deformability | d | mm | 2 | 2 | 18 | 13 | 12 |

I claim:

1. Nonwoven comprising two outer fibre layers and at least one inner fibre layer, the nonwoven comprising constructive fibres composed of a first polymer and binding fibres, the binding fibres being composed at least partially of a second thermoplastic polymer having a melting point which is lower than that of the first polymer, the nonwoven being characterized in that the inner layer or inner layers represent from 20 to 90% by weight of the nonwoven, and the outer layers each represent between 5 and 40% by weight of the nonwoven, the outer layers comprising at the very least 40% by weight of binding fibres, and having at least 5% by weight of the first polymer, the nonwoven being densified by needling on either side to a specific depth, there remaining a central zone not densified by needling, and the amount, based on percentage by weight, of the second polymer, being greater in the outer layers than in the inner layer or inner layers and the constructive fibres of the outer layers being finer than the constructive fibres of the inner layer.

2. Nonwoven according to claim 1, characterized in that the inner layer or inner layers represent 40 to 70% by weight of the nonwoven, and the outer layers each represent 15 to 30% by weight of the nonwoven.

3. Nonwoven according to claim 1, characterized in that the binding fibres are two-component fibres.

4. Nonwoven according to claim 1, characterized in that the outer layer or outer layers comprise from 60 to 80% of binding fibres and from 20 to 40% of constructive fibres.

5. Nonwoven according to claim 1, characterized in that the inner layer or inner layers comprise from 20 to 100% of binding fibres and having in relation to the outer layers at least 5% less of the second thermoplastic polymer and from 0 to 80% of constructive fibres.

6. Nonwoven according to claim 5, characterized in that the inner layer or inner layers comprise preferably from 40 to 60% of binding fibres and 40 to 60% of constructive fibres.

7. Nonwoven according to claim 1, characterized in that the binding fibres of the outer layers have a thickness of between 0.5 and 28 dtex.

8. Nonwoven according to claim 7, characterized in that the binding fibres of the outer layers have a thickness of between 1.5 and 10 dtex.

9. Nonwoven according to claim 1, characterized in that the constructive fibres of the outer layers have a thickness of between 0.5 and 28 dtex.

10. Nonwoven according to claim 9, characterized in that the constructive fibres of the outer layers have a thickness of between 1.5 and 12 dtex.

11. Nonwoven according to claim 1, characterized in that the binding fibres of the inner layer or inner layers have a thickness of between 3 and 40 dtex.

12. Nonwoven according to claim 11, characterized in that the binding fibres of the inner layer or inner layers have a thickness of between 4 and 28 dtex.

13. Nonwoven according to claim 1, characterized in that the constructive fibres of the inner layer or inner layers have a thickness of between 3 and 100 dtex.

14. Nonwoven according to claim 13, characterized in that the constructive fibres have a thickness of between 6 and 28 dtex.

15. Nonwoven according to claim 1, characterized in that the fibres all belong to the same family of polymers.

16. Nonwoven according to claim 15, characterized in that the fibres comprise 100% polyester.

17. Nonwoven according to claim 15, characterized in that the fibres comprise 100% polyamide.

18. Nonwoven according to claim 15, characterized in that the fibres comprise 100% polyolefin.

19. Nonwoven according to claim 1, characterized in that it is self-supporting.

20. Nonwoven according to claim 1, characterized in that it is thermoformable.

21. Nonwoven according to claim 1, characterized in that it comprises a finishing layer.

22. Nonwoven according to claim 1, characterized in that it comprises one or more physical reinforcements.

23. Nonwoven comprising two outer fibre layers and at least one inner fibre layer different from the outer layers, the nonwoven comprising constructive fibres composed of a first polymer and binding fibres, the binding fibres being composed at least partially of a second polymer, the melting point of which is lower than that of the first polymer, the nonwoven being characterized in that the inner layer or inner layers each represent from 20 to 90% of the total weight of the nonwoven and having constructive fibres with a first thickness, the outer layers comprising at the very least 40% by weight of binding fibres and having constructive fibres with a second thickness, and in that the nonwoven is densified by needling on either side to a specific depth, there remaining a central zone not densified by needling, the at least one inner layer and the outer layers being different in the following aspects:

- the content (in percentage) of second polymer is greater in each of the outer fibre layers than in the at least one inner fibre layer
- the thickness of the constructive fibres in the outer layer is less than the thickness of the constructive fibres in the inner layer and
- the at least one inner fibre layers comprises a central zone which is not densified by needling.

24. Nonwoven comprising two outer fibre layers and at least one inner fibre layer, the nonwoven comprising constructive fibres composed of a first polymer and binding fibres, the binding fibres being composed at least partially of a second thermoplastic polymer having a melting point which is lower than that of the first polymer, the nonwoven being characterized in that the inner layer or inner layers represent from 20 to 90% by weight of the nonwoven, and the outer layers each represent between 5 and 40% by weight of the nonwoven, the outer layers comprising at the very least 40% by weight of binding fibres, and having at least 5% by weight of the first polymer, the nonwoven being densified by needling on either side to a specific depth, there remaining a central zone not densified by needling, and the amount, based on percentage by weight, of the second polymer, being greater in the outer layers than in the inner layer or inner layers.

* * * * *